INVENTOR.
SAMUEL NISSIM
BY Arthur Freilich
ATTORNEY

INVENTOR.
SAMUEL NISSIM
BY

ATTORNEY

United States Patent Office 3,438,009
Patented Apr. 8, 1969

3,438,009
CONTENT ADDRESSABLE MEMORY
Samuel Nissim, Malibu, Calif., assignor, by mesne assignments, to The Bunker-Ramo Corporation, Stamford, Conn., a corporation of Delaware
Filed Jan. 3, 1964, Ser. No. 335,522
Int. Cl. G11c 5/02; G11b 5/64
U.S. Cl. 340—174 3 Claims

ABSTRACT OF THE DISCLOSURE

A memory element particularly useful in a content addressable memory. The memory element constitutes a magnetic device having a preferred axis of magnetization and including means for selectively orienting a storage field in first and second directions along the preferred axis. The storage field is displaced from the preferred axis by a DC bias field. First and second interrogate fields are employed to rotate the storage field in opposite directions to develop different output signals depending on the storage state. Thus, the state stored by the element can be compared with a search bit by employing different interrogate signals depending on the search bit state. The element is therefore well adapted for content addressable memory use. The content addressable memory columns can be interrogated in sequence with each column being energized after an interrogate pulse has traversed the previous column.

This invention relates generally to digital memories and more particularly to improvements in both content addressable type memories and memory elements adapted to be used therein, such memories being characterized by having the ability to permit all words stored in the memory to be searched in parallel, i.e., simultaneously.

U.S. Patent No. 3,031,650 discloses some basic content addressable memory implementations and discusses the characteristics which distinguish such memories from conventional digital memories. Briefly, the significant distinguishing characteristic is that each memory location in a content addressable memory is not uniquely identified by an address as in conventional diggital memories but instead content addressable memory locations are selected on the basis of information stored therein; i.e., the contents thereof. Hence, the name content addressable memory.

As a result of selecting locations on the basis of stored information, memory search times can be considerably reduced at the cost of some additional hardware. That is, in situations where it is desired to select those locations, out of N locations, in memory, storing information (words) identical to a search word, information identifying those locations can be derived in one memory access period instead on the N such periods required by conventional digital memories. More particularly, whereas it is necessary in a conventional digital memory to sequentially access the contents of each location (a word) and compare each such word for identity with a search word, comparison of the search word with all the stored words can be simultaneously effected in a content addressable memory.

Essentially, a content addressable memory operates by causing a signal representative of a search word bit to be applied simultaneously to all memory location elements storing bits of corresponding significance. Some type of logic means is provided in the memory, such means being operable to generate signals to indicate whether the bits stored in the various memory location elements are the same as or different from the corresponding search bit being sought. All elements of a single memory location are coupled to a common word sense line and by sensing resultant signals appearing on the word sense line, a determination is made as to whether or not the word stored in the memory location associated with the word sense line matches or mismatches the search word.

Whereas the content addressable memory embodiment disclosed in the aforementioned U.S. Patent No. 3,031,-650 utilizes means (e.g., a flip-flop or a pair of nondestructive readout magnetic cores) capable of providing both true and complementary manifestations for each stored information bit so as to permit all stored bits to be considered in parallel, as well as all stored words being considered in parallel, U.S. patent application Ser. No. 269,009, now Patent No. 3,297,995, filed Mar. 29, 1963, by Ralph J. Koerner and Alfred D. Scarbrough and assigned to the same assignee as the present application, discloses a content addressable memory requiring only a single element (e.g., nondestructive readout magnetic core) for each stored bit. In the cited patent application, the bits are considered serially or sequentially, while the words are still considered in a parallel fashion. In addition to a hardware reduction derived from a sequential, rather than a parallel consideration of the bits, several other advantages which are discussed in the cited patent application and will only briefly be mentioned here, are introduced. An initial advantage is that considerably higher signal-to-noise ratios are available on the word sense lines since only one element coupled thereto is operated on at a time. The provision of higher signal-to-noise ratios of course means that less critically designed and less expensive sense amplifiers can be employed. A second and very significant advantage is that by considering bits sequentially, very many useful searches, other than equality, can be performed; e.g., "greater than" and "less than" magnitude comparison searches can be easily performed as disclosed in the cited patent application.

In one form of the invention set forth in the cited patent application, all memory elements storing bits having the same degree of numerical significance are simultaneously compared with a corresponding bit of the search word and an equality decision is made at each such memory element such that the memory element provides a mismatch signal on a word sense line associated therewith whenever it stores a bit which mismatches the corresponding search bit. The sets of memory elements storing bits having different degrees of numerical significance are considered sequentially. All memory elements forming part of a common memory location; i.e., storing bits common to a single word are associated with the same word sense line and as a consequence, by sensing whether or not a mismatch signal appears on a particular word sense line, a conclusion can be drawn as to whether the stored word associated therewith matches the search word.

The content addressable memory in the cited patent application may be implemented by utilizing magnetic memory elements to which are coupled binary interrogation signals such that a first interrogation signal will cause a memory element to provide opposite polarity output pulses to respectively indicate its two possible states and a second interrogation signal will cause the memory element to provide output pulses opposite to those provided in response to the first interrogation signal. Although each memory element, therefore, provides either a match or mismatch signal depending upon whether the binary state represented by the interrogation signal is different from or the same as the bit stored by the element, preferably only mismatch signals appearing on the word sense lines are sensed. In the preferred embodiment of the invention disclosed in the cited patent application, the binary interrogation signals are respectively manifested by increasing and decreasing currents on a digit interrogate line in accordance with corresponding search word bits stored in a search word register. Each digit interrogate line is associated with magnetic memory elements storing bits of the same significance.

The present patent application is directed to a content addressable memory implementation in which binary interrogation signals are manifested by currents traversing digit interrogate lines in opposite directions. This type of manifestation is distinguishable from increasing and decreasing the magnitudes of currents traversing digit interrogate lines in the same direction as is specifically disclosed in one embodiment of the cited patent application.

In the normal operation of orthogonal magnetic field type binary memory elements, e.g., see a paper entitled "Biax High Speed Magnetic Computer Element," 1959, Wescon Convention Record, Part IV, pp. 40, 54) currents propagated in opposite directions through an interrogate line coupled to such an element elicit the same output response for a particular state. That is, regardless of the direction of a current in an interrogate line, a first output signal will be provided if the element is in a first state and a second output signal will be provided if the element is in a second state.

Inasmuch as certain heretofore undisclosed memory implementations are made possible if oppositely directed currents through an interrogate line coupled to an orthogonal field memory element can be made to elicit opposite responses, it is an object of this invention to provide a method of operating such an element to cause such opposite responses to be elicited.

In accordance with the invention, a bias current is continually applied to a winding of an orthogonal field memory element in order to develop a bias field to partially rotate the residual magnetic storage field. Oppositely directed interrogation currents applied to the element will respectively aid and oppose the bias current. Thus, the interrogation current either increases or decreases the degree of rotation caused by the bias current which, in turn, induces opposite polarity signals in a sense winding coupled to the element.

In accordance with a further aspect of the invention, the biased memory elements are employed in a content addressable memory implementation in which a single current step is serially propagated through a plurality of digit interrogate lines with the directional propagation in each line being determined by the state of a different search word bit.

A feature of the content addressable memory implementation introduced herein is that by propagating a single current step through a plurality of digit interrogate lines, the time delays inherently introduced between digit lines appropriately sequentially interrogates stored bits in order of numerical significance, thereby enabling magnitude comparison searches to be performed.

It is pointed out that the terms matrix "rows" and "columns" used herein refer only to groups of electrically related elements and should not be understood as imposing any actual physical limitations on the arrangements of the elements.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 2:
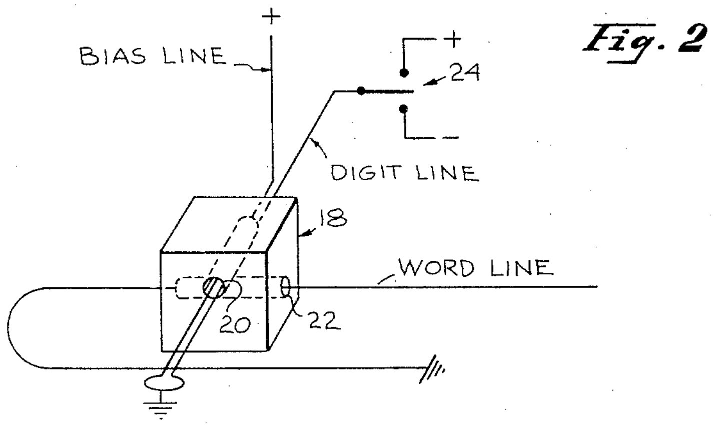
FIGURE 2 is a perspective view of a Biax memory element which can be suitably employed in the content addressable memory of FIG. 1.
Figure 3A:
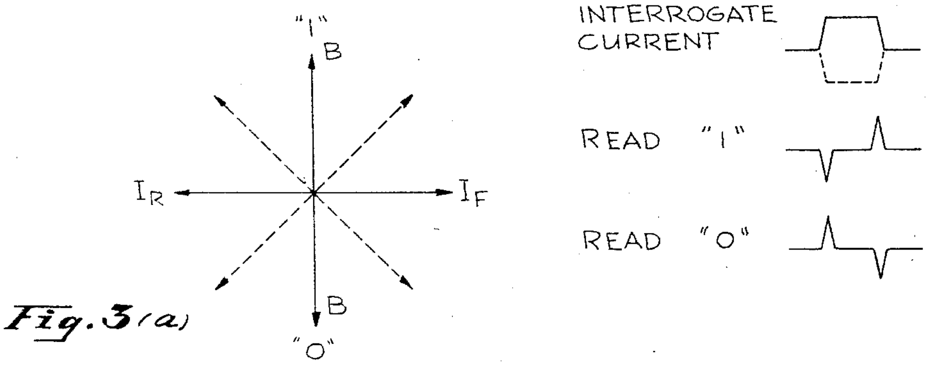
Figure 3B:
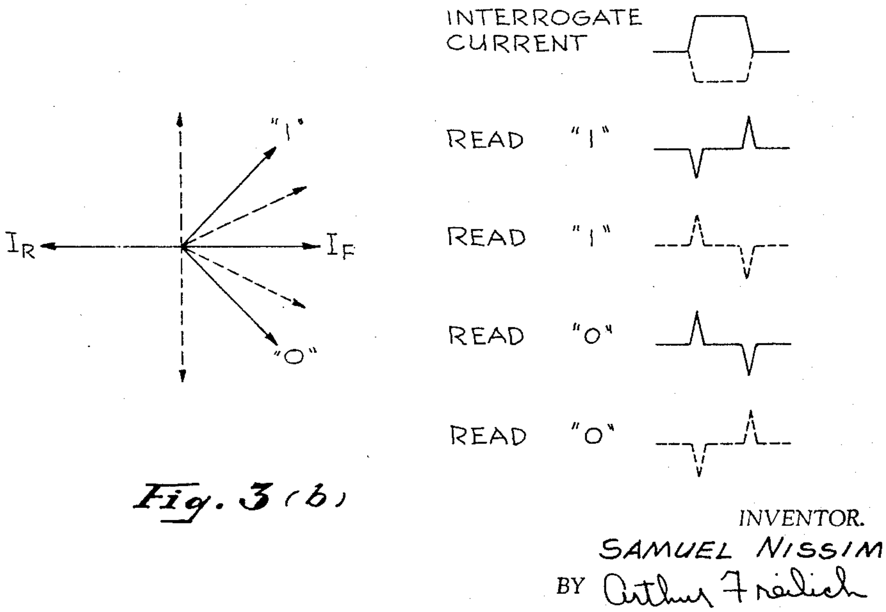

FIGURE 3*a* is a vector diagram and a waveform chart illustrating the operating characteristics of the memory element of FIG. 2 operated in a conventional unbiased fashion; and FIGURE 3*b* is a vector diagram and waveform chart illustrating the operating characteristics of the memory element of FIG. 2 biased in accordance with the present invention.

Figure 1:
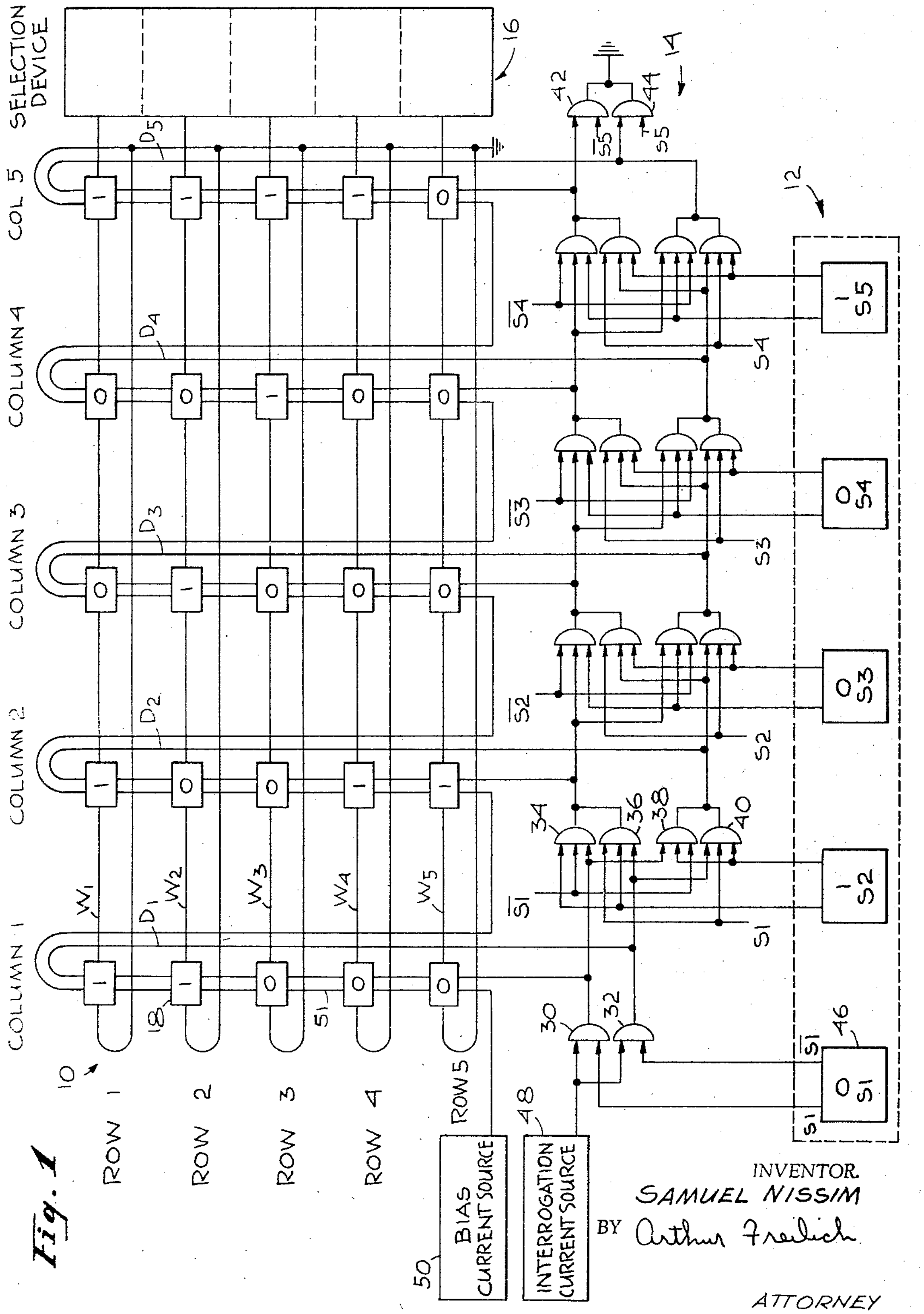
FIGURE 1 is a block diagram of a content addressable memory implementation in accordance with the present invention.

Attention is now called to FIG. 1 which illustrates a content addressable memory constructed in accordance with the present invention and including a memory matrix 10, a search register 12, interconnecting circuit means 14, and a selection device 16.

The exemplary matrix 10 includes N (herein 5) rows of memory elements, each row comprised of Q (herein 5) memory elements. Each of the memory elements 18 constitutes a bistable device thereby enabling it to assume first and second states respectively representative of the binary digits or bits, namely "0" and "1." Each of the matrix rows can appropriately be referred to as a memory location, each location being capable of storing a bit pattern constituting a single data word.

Each of the matrix columns consists of a plurality of memory elements each of which serves to store information of corresponding significance in a different row or memory location. That is, data words may in fact represent numerical quantities and it is common practice to place bits of corresponding significance in such words in correspondingly positioned memory elements. For example, binary information can be stored in the elements of the memory matrix such that elements in column one of the matrix respectively store the most significant bit of each stored data word and the elements of columns 2, 3, 4, and 5 in the matrix respectively store bits of decreasing numerical significance.

A digit line $D_1$ is associated with all the memory elements 18 of column 1 of the matrix. Similarly, digit lines $D_2$, $D_3$, $D_4$, $D_5$ are each correspondingly associated with all the memory elements of respectively different ones of the columns 2, 3, 4, and 5 of the matrix. On the other hand, a word line $W_1$ is associated with all the memory elements in row 1 of the matrix. Similarly, word lines $W_2$, $W_3$, $W_4$, and $W_5$ are correspondingly associated with the memory elements of rows 2, 3, 4, and 5 of the matrix.

Attention is now momentarily called to FIG. 2 showing a perspective view of a structural device constituting a memory element having operation characteristics making it suitable for use in the memory matrix 10 of FIG. 1.

FIG. 2 illustrates a magnetic memory element 18 commonly called a Biax. Such an element comprises a block of a magetic material having apertures 20 and 22 extending therethrough perpendicularly to one another. A digit line and a bias line are threaded through the aperture 20 and a word line is threaded through the aperture 22. The digit line is utilized as a conduction path for current to interrogate the state of the element 18 and is connected between ground and a single pole double throw switch 24 which can selectively connect the digit line to a source of either positive or negative potential. The word line is utilized to sense the state of the element 18. At least one additional line (not shown) would in practice be threaded through the aperture 20 in order to write information into the element 18 by selectively orienting the direction of a magnetic storage field about aperture 20. For the purposes of the discussion herein, it will be assumed that information has already been written into the memory element 18 and that the element is either in a first state of magnetization arbitrarily referred to as a binary "0" or second state of magnetization arbitrarily referred to as a binary "1." The bias line, whose function will be discussed more specifically hereinafter, is used to partially rotate the magnetic storage field.

Assuming the nonexistence of the bias line for a moment, the two possible storage states of the element 18 are represented vectorially in FIG. 3*a*. That is, the residual magnetic storage field existing around aperture 20 oriented in a first direction to represent a binary "0" is represented by a magnetic field (B) vector extending vertically downwardly while a vector extending vertically upwardly represents the residual magnetic storage field oriented in an opposite direction to represent a binary "1." In the conventional nonbiased operation of the memory element 18, an interrogate current pulse $I_F$ applied to the digit line, as by connecting the switch 24 to the positive potential source, develops a field transverse to the storage field which effectively rotates the "1" magnetic storage field vector clockwise and the "0" magnetic field vector counterclockwise. As a consequence of this magnetic field rotation, a negative pulse will be induced in the word line if the element stores a "1" while a positive pulse will be induced therein if the element stores a "0." When the interrogate current is terminated, the magnetic field vector reverts to its vertical position and, as a consequence, it can be seen that if the element stores a binary "1" a positive pulse will be induced in the word line and if the element stores a binary "0" a negative pulse will be induced in the word line. If the switch 24 is connected to the negative potential source instead of the positive potential source, an interrogate current pulse $I_R$ represented by the dotted line in FIG. 3*a* will be propagated through the digit line. As a consequence, the "1" magnetic field vector will be rotated counterclockwise while the "0" magnetic field vector will be rotated clockwise and it should be readily apparent from the figures that the output signals induced in the word line will be identical to those induced when the interrogate current was propagated in a forward direction through the digit line.

In accordance with the present invention, the memory element 18 is biased by a current existing in the bias line threaded through the aperture 20. As a consequence, if the element defines a binary "1," the "1" magnetic field vector is always rotated by some predetermined degree from the vertical as shown in FIG. 3*b*. Similarly, the "0" magnetic field vector is rotated in a counterclockwise direction from the vertical. If a positive interrogate current pulse is applied to the biased memory element, output signals identical to those illustrated in FIG. 3*a* are induced in the word line for the two possible memory element storage states. However, if a negative current pulse is applied to the word line, as by connecting switch 24 to the source of negative potential, then the output signals represented by dotted lines in FIG. 3*b* are derived from the two possible element storage states. Thus, it is apparent that if the memory element is biased, then for a particular state, opposite polarity output signals are developed in response to driving an interrogation current pulse through the digit line in opposite directions. It is this characteristic which enables the content addressable memory implementation disclosed herein to be provided inasmuch as state representations of search bits can be manifested by the direction in which interrogate current is driven through the digit lines. A further operating characteristic which is significant is that output pulses are induced in the word line coincident with a change in magnitude in the interrogate current in the digit line. For example, note that an increasing interrogate current step in the positive direction causes a negative output pulse to be induced on the word line when the element stores a binary "1" and a decreasing step in the positive direction causes a positive pulse to be induced in the word line. Further note that increasing and decreasing current steps in the negative direction cause opposite polarity output pulses to be induced in the word line for the same storage condition.

These operating characteristics form the basis of the content addressable memory implementation which is introduced herein. The operation of that implementation will be very clear if it is initially understood how the state of a memory element 18 can be compared with the state of a second binary storage device. Briefly, the direction of an increasing current step in the digit line is determined in accordance with the state of the second binary storage device so that a positive output pulse is provided on the word line whenever the states of the memory element 18 and secondary binary storage element differ.

More particularly, assume initially that the memory element stores a binary "1." If the second binary storage device stores a binary "1," then an increasing current step in the positive direction is applied to the digit line to thus cause a negative pulse to be induced in the word line. On the other hand, if the second binary storage device stores a binary "0," then an increasing current step in a negative direction is applied to the digit line to thus cause the positive pulse to be induced in the word line. Similarly, if the memory element stores a binary "0," an increasing interrogate current step in the positive direction, representative of a binary "1" in the second binary storage device would cause a positive pulse to be induced on the word line while an increasing interrogate current step in the negative direction would cause a negative pulse to be induced on the word line. By restricting the current changes to increase in opposite directions, it should be apparent that whenever a positive pulse is sensed on the word line, it can be concluded that the states of the memory element and second binary storage device mismatch.

In addition to the Biax, other memory elements have substantially the same characteristics as those illustrated in FIG. 3. For example, a wire memory element as disclosed by T. R. Long in an article entitled "Electrodeposited Memory Elements for a Nondestructive Memory," which appeared in the Journal of Applied Physics, vol. 31 (May 1960), pp. 123–124, possesses essentially the same operational characteristics as the Biax of FIG. 2 and can therefore also be utilized in the content addressable memory implementation of FIG. 1. In addition to the memory elements mentioned, still other types of elements having characteristics both identical to and different from those of the Biax can be employed in the invention.

Returning now to FIG. 1, it is pointed out that each of the digit lines is provided with first and second terminals which for the sake of simplicity will be respectively referred to as left and right terminals. It, of course, should be appreciated that the terms "left" and "right" merely refer to the orientation of the digit lines in the drawing and do not represent any actual limitation on the orientation of the lines. A plurality of sets of switching gates is provided with each set connecting the terminals of a corresponding digit line to a subsequent digit line. Thus, the left and right terminals of digit line $D_1$ are respectively connected to the outputs of AND gates 30 and 32. Each subsequent digit line is connected to the outputs of four AND gates. Thus, the left terminal of digit line $D_2$ is connected to the outputs of AND gates 34 and 36 while the right terminal thereof is connected to the outputs of AND gates 38 and 40. Thus, current entering the left terminal of digit line $D_2$ can enter through either AND gate 34 or 36 and similarly current entering the right terminal of digit line $D_2$ can enter through AND gate 38 or 40. On the other hand, current emerging from the right terminal of digit line $D_1$ is applied to the input of both of gates 36 and 40 while the current emerging from the left-hand terminal of digit line $D_1$ is applied to the inputs of gates 34 and 38. Current emerging from the left and right terminals of digit line $D_5$ respectively pass through gates 42 and 44 to ground.

The search register 12 includes five stages S1, S2, S3, S4, S5, each stage of which corresponds to one of the memeory matrix columns. All of the search register stages are substantially identical and each includes a binary element 46 which can comprise a conventional set-reset flip-flop circuit having set and reset input terminals and true and false output terminals.

An interrogation current source 48 is connected to the input of AND gates 30 and 32. The second inputs to AND gates 30 and 32 are respectively connected to the true and false output terminals of the search register stage S1. If stage S1 defines a binary "1," then an increasing interrogation current step provided by source 48 will be directed through AND gate 30 into the left terminal of digit line $D_1$. On the other hand, if stage S1 defines a binary "0," then the current step will be directed through AND gate 32 into the right terminal of digit line $D_1$. If current enters the left terminal of digit line $D_1$, then it should emerge from the right terminal thereof so that only gates 36 and 40 connected to the input of digit line $D_2$ should be enabled. In order to assure that only AND gates 36 and 40 are enabled and AND gates 34 and 38 are disabled when stage S1 defines a binary "1," the true output terminal of stage S1 is connected to the input of gates 36 and 40 and the false output terminal of stage S1 is connected to the input of gates 34 and 38.

Current emerging from the right terminal of digit line $D_1$ will therefore be directed into either AND gate 36 or AND gate 40. As noted, the output of AND gate 36 is connected to the left terminal of digit line $D_2$ and the output of AND gate 40 is connected to the right terminal thereof. The state of stage S2 determines which of AND gates 36 and 40 is enabled and thus the direction in which the current in digit line $D_2$ will be propagated. If stage S2 stores a binary "1," then AND gate 36 is enabled and the current emerging from the right terminal of digit line $D_1$ will enter the left terminal of digit line $D_2$. On the other hand, if stage S2 defines a binary "0," then the current emerging from the right terminal of digit line $D_1$ will enter the right terminal of digit line $D_2$. Thus, in accordance with the states of the search register stages, the increasing interrogation current step provided by source 48 will be directed in a specified direction through each digit line.

A bias current source 50 is connected to the bias line 51 which is threaded through the aperture 20 in all of the memory elements. The bias current serves to rotate the magnetic storage field vectors in each element to the positions shown in FIG. 3*b*.

In order to understand the operation of the content addressable memory implementation of FIG. 1, let it be assumed that the memory elements of each of the memory locations store the bits as indicated by the numbers within the boxes in FIG. 1 representative of the memory elements. Let it further be assumed that it is desired to determine whether or not any of the words stored in the memory locations are identical to the search word stored in the search register 12, the search word being represented by the numbers disposed in the boxes representative of the binary elements 46. Since stage 1 stores a "0," an increasing interrogation current step will be directed into the right terminal of digit line $D_1$ and will emerge from the left terminal thereof. As can be recalled from the description of FIG. 3*b*, the increasing current step traversing the digit line $D_1$ in a negative direction will cause positive output pulses to be induced in word lines associated with memory elements storing a binary "1." Thus, positive output pulses will be induced in word lines $W_1$ and $W_2$. These output pulses will be propagated along the word lines toward the selection device 16 and will have passed the memory elements in column 2 by the time the interrogation current step emerges from the left terminal of digit line $D_1$ and is propagated through digit line $D_2$. Inasmuch as stage S1 stores a binary "0," either gate 34 or 38 connected to the input of digit line $D_2$ will be enabled. Since stage S2 defines a binary "1," AND gate 34 will be enabled to direct the interrogation current step emerging from the left terminal of digit line $D_1$ into the left terminal of digit line $D_2$. As should be apparent from FIG. 3*b*, positive output pulses will thus be developed on word lines $W_2$ and $W_3$. Again, these positive output pulses induced in the word lines will be propagated sufficiently fast so as not to interfere with output pulses induced by the action of memory elements in column 3. The interrogation current step will emerge from the right terminal of digit line $D_2$ and will enter the right terminal of digit line $D_3$. As a consequence, a positive output pulse will be induced in word line $W_2$. Similarly, the interrogation current step will enter the right terminal of digit line $D_4$ to thereby induce a positive output pulse in word line $W_3$. The interrogation current step emerging from the left terminal of digit line $D_4$ will be directed into the left terminal of digit line $D_5$ to thereby cause a positive output pulse to be induced in word line $W_5$.

Thus, it can be seen from the above example that positive output pulses will be induced in each of the word lines, except word line $W_4$, in the course of propagating an interrogation current step serially through all of the digit lines from source 48 to ground. The absence of an output pulse appearing on word line $W_4$ can be interpreted as meaning that the word stored in memory location 4 matches the search word stored in the search register.

It accordingly has been shown that the content addressable memory of FIG. 1 can be operated to simultaneously search all the words stored in memory to determine whether or not any of the search words match a search word stored in the search register. Athough all the words were searched simultaneously in the sense that corresponding bits of all of the words were simultaneously considered, it is to be noted that the bits of each word were considered sequentially. As a consequence, it was not possible for more than one memory element at any one time to induce pulses on a particular word line. Consequently, the signal-to-noise ratio on each of the word lines is exceptionally high.

In addition to utilizing the content addressable memory of FIG. 1 to determine whether any of the stored words exactly match a search word, the content addressable memory can be easily employed to located stored words whose magnitude is "equal to or greater than" or "equal to or less than" the search word. This can be accomplished, as is explained, in the previously cited U.S. patent application, by merely ascertaining whether the first mismatch signal developed on each word line corresponds to a search register stage storing a binary "1" or a binary "0." If the initial mismatch signal associated with a particular word is developed when a binary "1" search word bit is being considered, then the stored word must necessarily have a magnitude less than the search word. On the other hand, if the initial mismatch signal for a particular word is developed when a binary "0" search word bit is being considered, then the stored word must necessarily be greater than the search word. The selection device 16 is provided for sensing mismatch signals (herein positive output pulses) appearing on the word lines. The selection device can be of the type discussed either in the above-cited patent application or in U.S. patent application Ser. No. 296,001 filed by Robert N. Mellott on July 18, 1963 and assigned to the same assignee as the present application.

Each of the AND gates 16 can constitute one or more serially connected transistors with the base of each transistor being connected to a different search register stage output terminal. Thus, for example, AND gate 34 can consist of first and second PNP transistors whose bases are respectively connected to the false output terminal of element $S_1$ and the true output terminal of element $S_2$. The left terminal of digit line $D_1$ is connected to the emitter of the first transistor and the collector of the first transistor is connected to the emitter of the second transistor. The collector of the second transistor is connected to the left terminal of the digit line $D_2$. It should be appreciated that the suggested AND gate implementations are exemplary only and that innumerable other types of gates can be employed. For example, diode gates can be advantageously used with any necessary gain of wave shaping being introduced by occasional transistor circuits.

From the foregoing, it should be apparent that a method of operating a memory element has been disclosed herein which enables the element to provide opposite polarity output signals in response to currents directed in opposite directions through an interrogate line coupled thereto. It has further been shown how such an element can advantageously be employed in a content addressable memory apparatus in which a single current step can be directed through a plurality of serially connected digit interrogate lines to enable the columns of a memory matrix to be sequentially interrogated. It has been mentioned that such sequential interrogation provides exceedingly good signal-to-noise characteristics and in addition, if the sequentiality is in order of numerical significance, enables magnitude comparison searches to be performed. Moreover, by coupling the plurality of digit lines in series, advantage can be taken of the propagation delays inherent in the circuits which delays serve to introduce the interrogation sequentiality without requiring the provision of other timing means.

The embodiments of the invention in which an exclusive property or privilege is claimed are defined as follows:

1. A content addressable memory comprising:

a matrix of memory elements respectively including N rows of elements, each row comprising a memory location capable of storing a word, and Q columns of elements, each column including a corresponding memory element from each location;

a search register including Q storage elements capable of storing a search word;

a plurality of digit lines each having first and second ends and each of which is associated with all of the elements of a different one of said matrix columns and a corresponding storage element of said search register;

a plurality of sets of switch means each associated with a different one of said digit lines and a corresponding storage element for serially connecting the associated digit line to a subsequent digit line;

each set of switch means including first and second switches respectively connecting the first end of a digit line to the first and second ends of a subsequent digit line and third and fourth switches respectively connecting the second end of a digit line to the first and second ends of a subsequent digit line;

means responsive to the state of each of said storage elements and to the state of a subsequent storage element for closing one of said switches in the corresponding set of switch means;

a plurality of word lines each of which is associated with all the memory elements of a different one of said rows;

each of said memory elements being respectively responsive to a current in first and second directions on a digit line associated therewith for respectively providing pulses of opposite first and second polarities on a word line associated therewith when said memory element stores a binary "0" and for respectively providing pulses of second and first polarities when said memory element stores a binary "1";

means for applying a current step to a first of said plurality of digit lines for propagating a current through all of said digit lines; and means for sensing pulses on each of said word lines.

2. The content addressable memory of claim 1 wherein each of said memory elements includes means defining a magnetic storage field and wherein current in the digit line associated therewith functions to rotate said magnetic storage field.

3. The content addressable memory of claim 2 including bias means associated with each of said memory elements for rotating said magnetic storage field.

References Cited

UNITED STATES PATENTS

| | | | |
|---|---|---|---|
| 3,206,735 | 9/1965 | Lee | 340—174 |
| 3,155,945 | 11/1964 | Keefer | 340—174 |
| 3,278,914 | 10/1966 | Rashleigh et al. | 340—174 |
| 3,195,108 | 7/1965 | Franck | 340—146.2 |

BERNARD KONICK, *Primary Examiner.*

PHILIP SPERBER, *Assistant Examiner.*